United States Patent
Majd et al.

(10) Patent No.: US 8,861,336 B2
(45) Date of Patent: Oct. 14, 2014

(54) SYSTEMS AND METHODS FOR INTEGRATING ROUTE AND RANK INFORMATION INTO CALL DETAIL RECORDS

(71) Applicant: Vonage Network, LLC, Holmdel, NJ (US)

(72) Inventors: Casem Majd, Holmdel, NJ (US); Kenneth Viaud, Somerset, NJ (US); Marek Rusinski, Toms River, NJ (US); Nirav Kadakia, Parlin, NJ (US)

(73) Assignee: Vonage Network, LLC, Holmdel, NJ (US)

( * ) Notice: Subject to any disclaimer, the term of this patent is extended or adjusted under 35 U.S.C. 154(b) by 0 days.

(21) Appl. No.: 13/754,489

(22) Filed: Jan. 30, 2013

(65) Prior Publication Data
US 2014/0211784 A1    Jul. 31, 2014

(51) Int. Cl.
*H04L 12/28*    (2006.01)
*H04L 12/26*    (2006.01)

(52) U.S. Cl.
CPC ..................... *H04L 43/50* (2013.01)
USPC ........... 370/221; 370/352; 370/241; 370/252; 379/112.06; 379/112.1; 379/134; 379/221.05

(58) Field of Classification Search
CPC .... H04M 7/1285; H04M 15/56; H04M 15/58
USPC ................. 370/216, 221, 351, 352, 241, 252; 379/112.01, 112.06, 112.1, 133, 134, 379/220.01, 221.05
See application file for complete search history.

(56) References Cited

U.S. PATENT DOCUMENTS

| | | | | |
|---|---|---|---|---|
| 7,502,458 | B2 * | 3/2009 | Zino et al. | 379/220.01 |
| 8,209,390 | B1 * | 6/2012 | Gibbs et al. | 709/206 |
| 8,432,791 | B1 * | 4/2013 | Masters | 370/221 |
| 2004/0252818 | A1 * | 12/2004 | Liu | 379/126 |
| 2008/0194251 | A1 | 8/2008 | Tischer et al. | |
| 2009/0129374 | A1 | 5/2009 | Yurchenko et al. | |
| 2012/0089410 | A1 | 4/2012 | Mikurak | |
| 2012/0257547 | A1 | 10/2012 | Oren et al. | |
| 2012/0263172 | A1 | 10/2012 | Bhattacharya et al. | |
| 2013/0060838 | A1 * | 3/2013 | Yaffe | 709/203 |

OTHER PUBLICATIONS

Rosenberg, J. et al., SIP: Session Initiation Protocol, RFC 3261, Network Working Group, Jun. 2002, pp. 270.
Office Action Issued in U.S. Appl. No. 13/754,106 on Jun. 17, 2013.
Office Action Issued in U.S. Appl. No. 13/754,562 on Jul. 1, 2013.

* cited by examiner

*Primary Examiner* — Un C Cho
*Assistant Examiner* — Siming Liu
(74) *Attorney, Agent, or Firm* — Nixon & Vanderhye P.C.; Joseph Pagnotta

(57) ABSTRACT

The present technology is directed to systems and methods for integrating route and rank information into call detail records. The system receives information relating to a communication that is established between a first communication device and a second communication device. The information includes routing information for the established communication that includes at least a route identifier and a rank identifier. The system records the received route identifier and the rank identifier in a call detail record that is generated for the established communication. The route and rank information may be analyzed to for various purposes including troubleshooting and quality improvement.

17 Claims, 8 Drawing Sheets

ROUTING TABLE

| ROUTE | RANK | | | |
|---|---|---|---|---|
| | A | B | C | D |
| 70381 | 192.168.1.7 | 172.143.5.1 | 161.7.42.173 | 16.14.72.161 |
| 703816 | 224.7.1.23 | 73.22.271.153 | 42.12.77.16 | 16.184.254.1 |
| 7038164 | 7.216.42.7 | 92.48.121.243 | 117.216.152.168 | 43.54.171.16 |
| 70381641 | 57.98.4.143 | 17.183.4.5 | 92.176.253.4 | 44.47.91.16 |
| 70382 | 124.168.7.16 | 117.4.16.182 | 152.17.24.16 | 216.204.128.16 |
| 703821 | 104.168.152.214 | 16.72.148.12 | 72.112.74.14 | 92.168.173.254 |
| 7038214 | 78.172.14.70 | 87.143.17.152 | 124.16.182.117 | 148.168.172.104 |

FIGURE 3

| Originating # | Termination # | Begin Time | End Time | Route | Rank |
|---|---|---|---|---|---|
| 7034258567 | 7038164312 | 23:41:32 | 23:48:14 | 7038164 | C |

FIGURE 4

SYSTEMS AND METHODS FOR INTEGRATING ROUTE AND RANK INFORMATION INTO CALL DETAIL RECORDS

FIELD OF THE TECHNOLOGY

The technology is related to voice over Internet protocol (VOIP) telephony systems, and more specifically, to systems and methods for recording information about the route that a particular telephony communication traverses across a data network.

BACKGROUND OF THE TECHNOLOGY

In the present telecommunication environment, placing calls and transmitting information between telephony devices is more prevalent than ever. With the growing number of mobile telephones, communication networks have been continually striving to maintain pace with respect to cost, bandwidth, and communication quality. Call quality is a key factor for consumers when deciding which provider to subscribe to or over which network to place a phone call.

In addition to placing calls over a cellular network, consumers are also presented with the option of placing calls over a data connection via a VOIP telephony service provider. VOIP telephony service providers now give consumers more flexibility in how the consumer can place a phone call.

When a customer of an IP telephony system wishes to place a call to a destination telephony device, it is usually necessary to establish communications between a first gateway or proxy server of the IP telephony system which communicates with the customer's telephony device and a second gateway that communicates with the called or destination telephony device. The two gateways communicate with one another to setup the call between the customer's telephony device and the destination telephony device. The setup procedures may include establishing a different path through the data network that will be used to communicate data packets bearing the media of the call. For example, a media relay may be used to relay data packets bearing the media of the call back and forth between the customer's telephony device and the destination telephony device. Thus, various different elements in the data network can become involved in establishing and carrying a VOIP call.

When a new call setup request is received from a customer's telephony device by a proxy server of an IP telephony system, the proxy server typically consults a routing table to determine the identity of a proxy server or a destination gateway that is capable of establishing the call to the called, destination telephony device. The obtained information is typically an IP address of the proxy server or destination gateway, which is the information needed to contact the proxy server or destination gateway. In fact, the proxy server setting up the call may obtain a list of a plurality of IP addresses for a corresponding plurality of proxy servers or gateways that are capable of establishing the requested communication to the called telephony device. The list of IP addresses is provided in a priority order.

Once the proxy server setting up the call has a list of IP addresses of candidate proxy servers or destination gateways, the proxy server sends a call setup request to the device having the first IP address in the list, in an attempt to setup the requested call through the first candidate proxy server or destination gateway. If the first call setup attempt is unsuccessful, the proxy server setting up the call sends a second setup request to the device having the next IP address on the list. This process repeats until the call is established, or until the proxy server runs out of IP addresses to try.

Each time that a VOIP call is placed, a call detail record (CDR) is established for the call. The CDR for a call includes various items of information about the call, such as the originating telephone number, the destination telephone number, the time that the call started and ended, as well as various other items of information. Typically, the proxy server of destination gateways that are contacted to try to setup the call will forward items of information to the IP telephony system, and the IP telephony system uses that information to create a CDR for the call. Once the call is completed, the IP telephony system stores a final CDR that contains a final set of information about the call.

The information in the final CDRs is used by the IP telephony system for billing purposes, and in many cases for quality assurance and troubleshooting. The information in the CDRs may also be used to establish or adjust the routing tables that are consulted by the proxy servers setting up calls. The CDRs may also be used for various other purposes, as is well known to those of ordinary skill in the art.

A CDR for a call may include information that identifies the elements of the data network which were used to setup and carry the call. For example, a CDR may include the IP address of the proxy server or destination gateway that was responsible for setting up the call, and possibly the IP addresses of any media relays that were used to communicate data packets bearing the media of the call.

As explained above, during the initial call setup procedures, it is common for the proxy server setting up a call to make several unsuccessful call setup attempts through multiple candidate proxy servers or destination gateways before the call ultimately is established between the calling telephony device and the called telephony device. While the final CDR for the call may include information identifying the proxy server or destination gateway that ultimately setup the call, the CDR does not presently include information that can be used to determine if other candidate gateways tried and failed to setup the call before the call was ultimately successfully established by the gateway identified in the CDR.

Note, CDRs may be established for each unsuccessful call setup attempt. But the CDR which contains information about the successful attempt, when the call was actually conducted, does not include information about the previous unsuccessful setup attempts.

Thus, there is a need to provide information in CDRs that would allow an IP telephony system to determine when proxy servers and destination gateways are frequently failing to setup requested calls.

BRIEF DESCRIPTION OF THE FIGURES

FIG. 3 is a diagram showing a routing table that can be used to obtain the identity of devices capable of connecting a VOIP telephony communication to a destination telephony device;

FIG. 4 is a diagram showing some information that may be stored in a call detail record for a telephony communication;

DETAILED DESCRIPTION OF PREFERRED EMBODIMENTS

Figure 1:
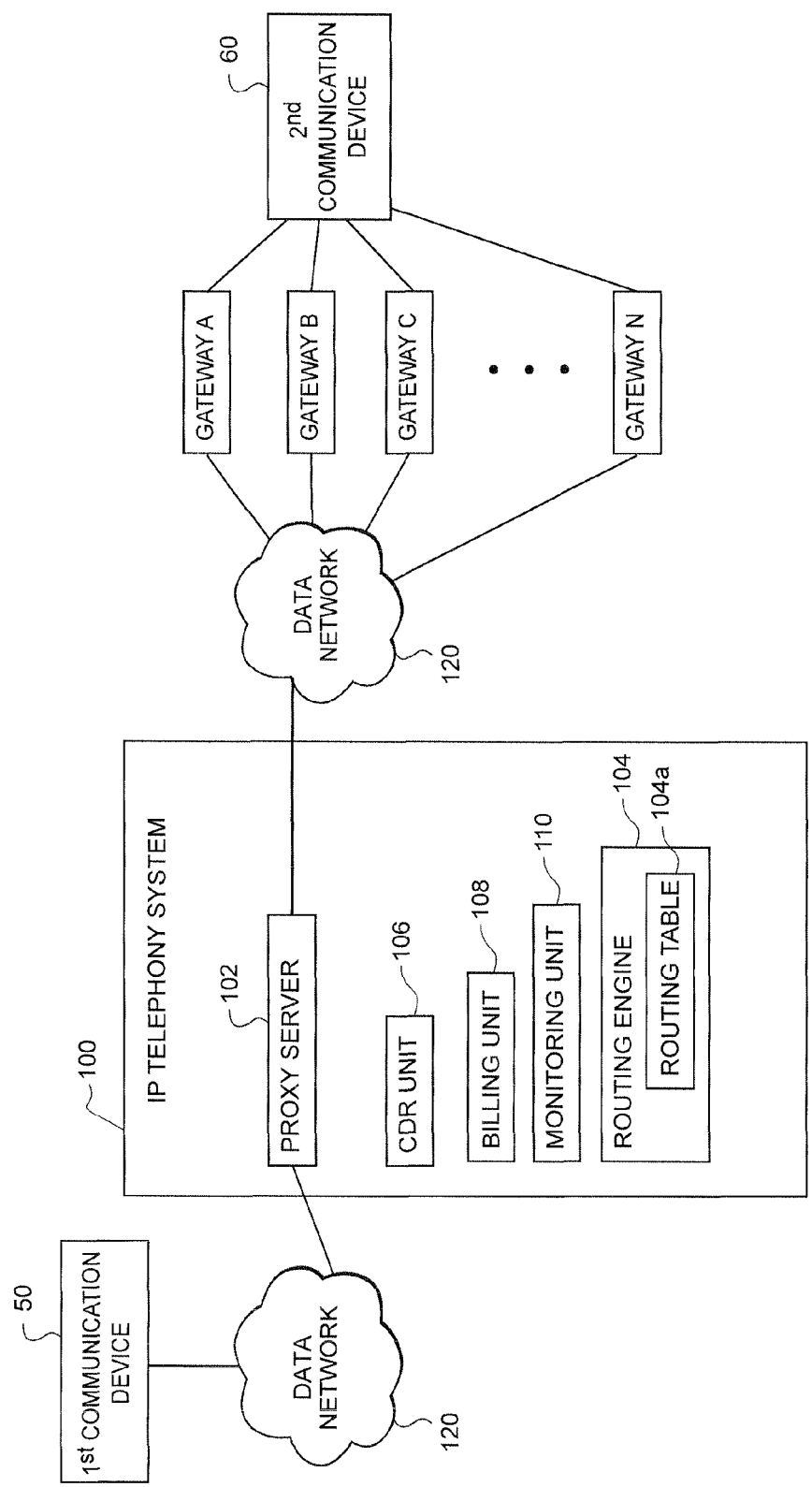
FIG. 1 is a diagram of a communications environment that can connect a VOIP telephony communication between two communication devices.

In the following description, references are made to a telephony device. The term "telephony device" or "communication device" is intended to encompass any type of device capable of acting as a telephony device. This includes a traditional analog telephone, an IP telephone, a computer running IP telephony software, cellular telephones, mobile telephony devices such as smartphones that can connect to a data network and run software applications, such as the Apple iPhone™, mobile telephony devices running the Android™ operating system, Blackberry™ mobile telephones, and mobile telephones running the Symbian® operating system.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod touch can interact with an IP telephony system to conduct a telephone call.

The following description will also refer to telephony communications and telephony activity. These terms are intended to encompass all types of telephony communications, regardless of whether all or a portion of the calls are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

The term "call" or "telephone call" is used in the following description for ease of reference, clarity and brevity. However, the systems and methods described below which involve handling, routing and terminating calls would also apply to systems and methods of handling, routing and terminating other forms of telephony-based communications. Thus, the terms call and telephone call are intended to include other forms of telephony-based communications.

In some systems and methods embodying the technology, telephony communications are effected over a packet-based data network. Signaling that is conducted in the packet-based data network may be executed using Session Initiation Protocol (SIP). SIP is a popular communication protocol for initiating, managing and terminating media (e.g., voice, data and video) sessions across packet-based data networks that typically use the Internet Protocol (IP), of which Voice Over Internet Protocol (VOIP) is an example. The details and functionality of SIP can be found in the Internet Engineering Task Force (IETF) Request for Comments (RFC) Paper No. 3261 entitled, "SIP: Session Initiation Protocol" herein incorporated in its entirety by reference.

SIP establishes and negotiates a session, including the modification or termination of a session. It uses a location-independent address system feature in which called parties can be reached based on a party's name. SIP supports name mapping and redirection, allowing users to initiate and receive communications from any location. Of course, while SIP is a preferred protocol for establishing communications over a data network, other signaling protocols could also be used to perform the invention.

Typically, the systems that generate call detail records (CDRs) and that monitor call quality are detached from those that use used to route new call requests. The present technology relates to integrating routing information into CDRs for IP telephony communications. As will be explained, the information that is incorporated into the CDRs can be analyzed and used to improve the routing of new call requests.

FIG. 1 depicts a communications environment that can be used to establish telephony communications between telephony devices. The elements in FIG. 1 include a first communication device 50 and a second communication device 60. Of course, the example shown in FIG. 1 is not limited to only first and second communication devices and the system envisions communication between a large number of communication devices.

FIG. 1 also shows an IP telephony system 100 capable of establishing a telephony communication between the first communication device 50 and the second communication device 60 via a data network 120, and one of Gateways A-n. In many instances, the data network 120 is the Internet. However, a private data network could also be used.

The IP telephony system 100 includes a proxy server 102 which receives a communication setup request from the first communication device 50 and which attempts to establish the requested communication between the first communication device 50 and the second communication device 60. The IP telephony system 100 may also have a routing engine 104 that includes one or more routing tables 104a. As will be explained in greater detail below, in the information contained in the routing table 104a is used by the proxy server 102 to help establish the requested communication. In alternate embodiments, the proxy server 102 may have a routing table stored locally, which would eliminate the need to consult a separate routing engine 104.

The IP telephony system 100 can also include a CDR unit 106 for compiling and storing CDRs. The CDR unit 106 is capable of communicating information to a billing unit 108 that bills for the communications provided by the IP telephony system 100. The CDR unit 106 also communicates with a monitoring unit 110 that can analyze information in the CDRs for purposes of trouble shooting and analysis.

Each of Gateways A-n is capable of establishing a telephony communication with the second communication device 60. Typically, each gateway will have its own IP address. The IP addresses of Gateways A-n are stored in the routing table 104a of the routing engine 104.

Figure 2:
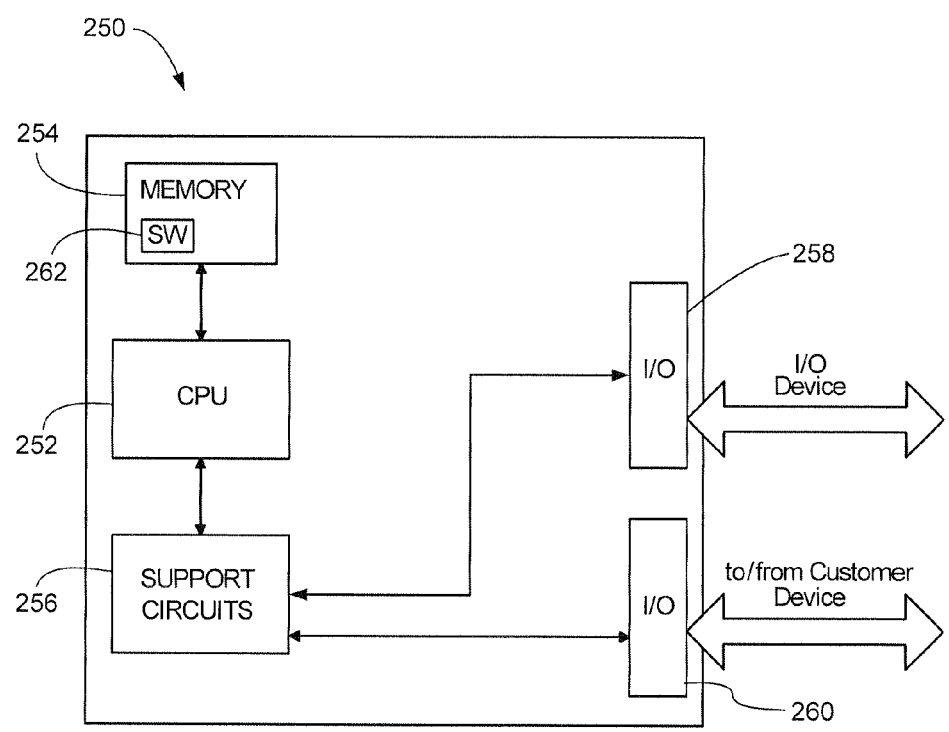
FIG. 2 is a schematic diagram of a controller that may be used to practice one or more embodiments of the present technology.

FIG. 2 illustrates elements of a computer processor 250 that can be incorporated in elements of the IP telephony system 100 to accomplish various functions. The IP telephony system 100 could utilize multiple processors 250 located at various locations, along with their operating components and programming, each carrying out a specific or dedicated portion of the functions performed by the IP telephony system 100.

The processor 250 shown in FIG. 2 may be one of any form of a general purpose computer processor used in operating an IP based communication system. The processor 250 comprises a central processing unit (CPU) 252, a memory 254, and support circuits 256 for the CPU 252. The processor 250 also includes provisions 258/260 for connecting the processor 250 to customer equipment via one or more access point and a data channel provided by a cellular service provider, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

Another form of processor 250 that assists in execution and is otherwise part of the subject invention is found within one or more of the mobile telephony devices. Such devices are sufficiently advanced beyond early generation cellular telephones that they contain processors capable of running operating systems developed by device manufactures, as well as third party applications that are downloaded and installed by users, to performing a myriad of communications and non-communications oriented tasks.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 100. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

An example of how a telephony communication is established between the first communication device 50 and the second communication device 60 will now be described with reference to FIG. 1.

When a user of the first communication device 50 wishes to place a telephone call to the second communication device 60, the user dials the telephone number assigned to the second communication device 60. This causes the first communication device 50 to send a call setup request to the proxy server 102 of the IP telephony system 100. The proxy server 102 must then identify at least one gateway that is capable of completing the call to the second communication device 60.

In some embodiments, the proxy server 102 consults a separate routing engine 104 to obtain the IP addresses of candidate gateways that are capable of completing the requested call to the second communication device 60. An entry in a routing table 104a of the routing engine 104 will provide this information. In other embodiments, a routing table with this information may be present on the proxy server 102 itself. Typically, the information in the routing table 104a will include the IP addresses of multiple gateways which are capable of completing the requested telephony communication to the second communications device 60. In this example, when the proxy server 102 consults a routing table 104a, the routing table 104a includes the IP addresses assigned to Gateways A-n, each of which is capable of communicating with the second communications device 60.

FIG. 3 shows a diagram of an example routing table 300 which could be stored by the routing engine 104. A copy of such a routing table also could be stored locally at the proxy server 102. Each row of the routing table begins with a pattern of numbers, the numbers corresponding to the telephone number that a caller would dial to place a call. Each row also includes a series of IP addresses. The IP addresses are the IP addresses of candidate gateways that are capable of completing a call to telephony devices which have an assigned number which begins with the numeral pattern at the beginning of the row.

For purposes of the following discussion, the numerical pattern at the beginning of each row is referred to as a "route." Also, the position of each IP address in a row is referred to as the "rank" of the IP address. For example, the first row of the table in FIG. 3 has a route of 70381. The first IP address coming after the route, which is "192.168.1.7," has the rank A. The second IP address, which is "172.143.5.1," has the rank B, and so forth.

In the example shown in FIG. 3, only ranks A-D are provided. However, a greater or lesser number of ranks may be present in a routing table. Also, in the example shown in FIG. 3, each route includes IP addresses for ranks A-D. In some routing tables, certain routes may not include the same number of ranked IP addresses as other routes.

With reference to FIGS. 1 and 3, when the proxy server 102 receives a call setup request from the first communication device 50, the proxy server 102 consults a routing table such as the one shown in FIG. 3 to obtain the IP addresses of candidate gateways capable of completing the requested call to the second communication device 60. The proxy server 102 identifies an entry of the routing table that has a route that matches the leading digits of the telephone number dialed by the calling party. The IP addresses in that entry are the IP addresses of gateways capable of completing calls to telephone numbers having the indicated route. The proxy server 102 will contact the candidate gateways in the rank order when attempting to setup the requested communication.

For example, if the proxy server 102 receives a call setup request from the first communication device 50, and the call setup request indicates that the number dialed by the user was 703-816-2322, the proxy server 102 would select the second entry of the routing table shown in FIG. 3, because that entry has a "route" that matches the leading digits of the dialed number. The proxy server 102 then sends a first call setup request to the IP address having the A rank. If that gateway cannot setup the call, the proxy server sends a second call setup request to the IP address having the B rank. This process repeats until the call is established, or the proxy server 102 has run out of IP addresses. If the communication cannot be established via any of the candidate gateways, the proxy server 102 may play a message to the calling party indicating that the call cannot be connected at this time.

If multiple ones of the candidate gateways are unable to setup the requested communication, each candidate gateway may have the same reason why it cannot setup the requested communication, or each candidate gateway may have a different reason why it cannot setup the requested communication. For example, the first candidate gateway may be unable to accept any more connections while the second candidate gateway may not be working properly.

Assuming that the communication is established by one of the candidate gateways A-n, information about the communication is ultimately reported back to the CDR unit 106 of the IP telephony system 100. Such information is typically reported to the CDR unit 106 by the gateway that ultimately established the communication to the second communication device 60. If a media relay is used to facilitate the communication of data packets bearing the media of the call, the media relay may also report information to the CDR unit 106. In some instances, the CDR unit 106 may actively query one or more of the devices involved in setting up and carrying telephony communication. In other instances, the devices involved in setting up and carrying the communication may automatically send information about the communication to the CDR unit 106.

The information reported to the CDR unit 106 can include the identity or the IP address of the proxy server 102 and the gateway that ultimately established the communication to the second communication device 60, as well as the starting and end time of the communication. The identity or telephone number of the first communication device 50 and the second communication device 60 will be reported to the CDR unit 106. Various other items of information may also be reported to the CDR unit 106.

FIG. 4 illustrates information that could appear in a CDR that is established for a telephony communication. As shown therein, the CDR includes the originating telephone number of the device that initiated the call. The CDR also includes the telephone number of the destination telephony device that was dialed by the calling party. The start time and end time are recorded. Also, the route which was selected from the routing table that was used to setup the call is listed, along with the rank of the gateway that ultimately setup the call. The route and rank information illustrated in FIG. 4 were not previously recorded in CDRs. However, when this information is included in the CDRs of telephony communications, the information can be used for trouble shooting, analysis, and quality improvement, as will be explained below.

In order for the CDR unit 106 to include the route and rank information in the CDRs which it creates, the information must be reported to the CDR unit 106. Because the CDR unit 106 typically uses information reported from the gateway that completed the communication to generate the CDR for the communication, it is necessary for the route and rank information first to be communicated from the proxy server 102 to the gateway that completed the communication. This is information that the gateway would not normally have. The route and rank information then can be reported to the CDR unit 106 by the gateway which established the communication to the called telephony device.

One way to inform the gateway of the route and rank information is for the proxy server 102 to encode this information into the setup signaling that is sent to the gateway. Each time that the proxy server 102 sends a call setup request to a gateway, the route and rank information would be encoded into unused fields of the setup signaling. The gateway would then have this information, and the gateway could report it to the CDR unit 106, along with other information.

Figure 5:
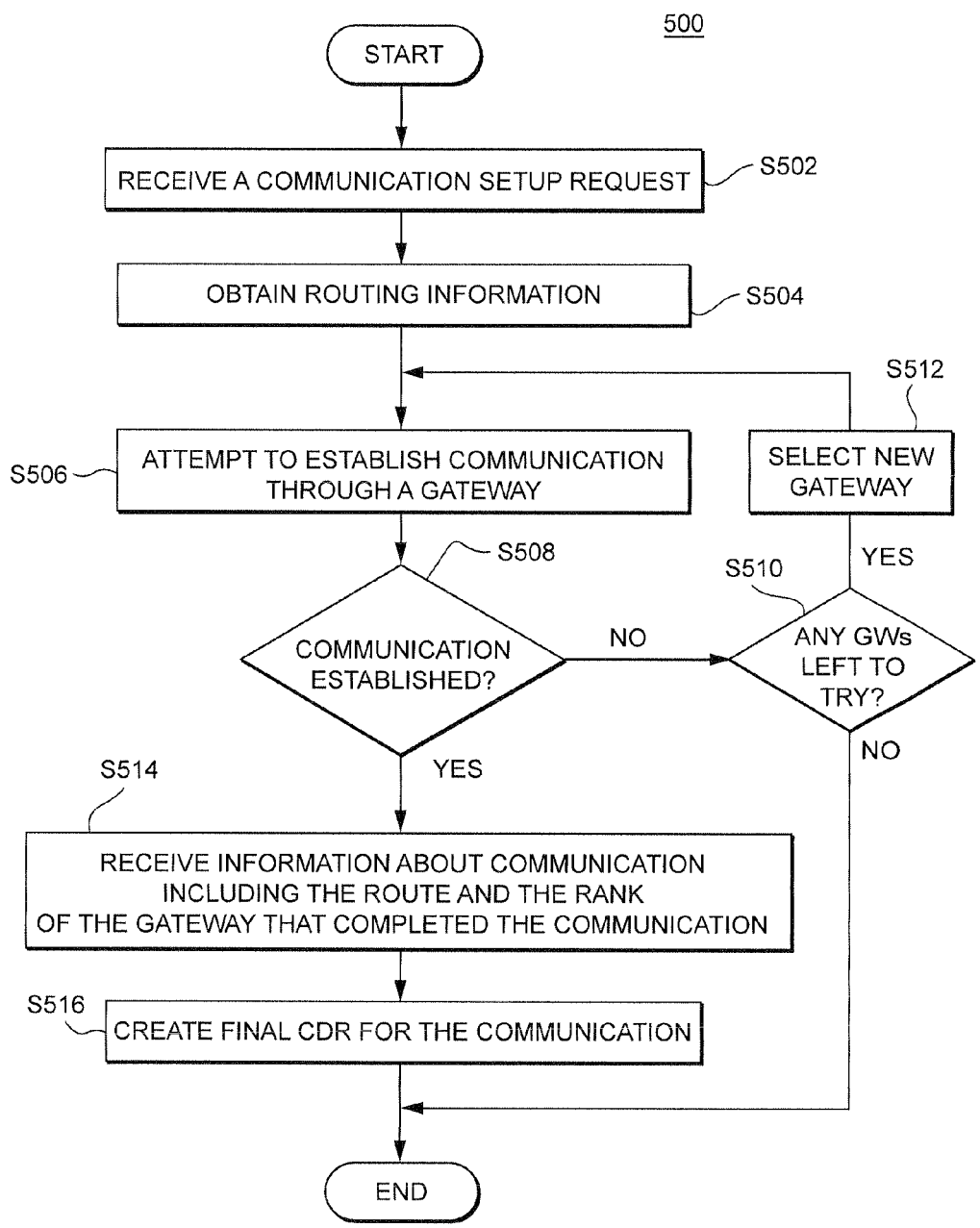
FIG. 5 is a diagram illustrating steps of a method for integrating routing information into a call detail record.

FIG. 5 illustrates steps of a method 500 for integrating route and rank information into a CDR. Although not limited to this particular embodiment, the IP telephony system 100 may execute the process shown in FIG. 5. The method begins and proceeds to step S502, where the proxy server 102 receives a communication setup request from a first communication device 50. In step S504, the proxy server 102 obtains routing information for the requested communication. The routing information may be obtained from a routing engine 104, or from a routing table that is stored locally on the proxy server 102. The routing information will include the IP addresses of candidate gateways that are capable of completing the requested communication to the called, or second communication device 60. The routing information will also include the "route", which is the matched dial pattern for the row of the routing table used for this communication.

In step S506, the proxy server sends a communication setup request to the device having the first IP address it obtained, which is the IP address of the first candidate gateway. In step S508 a check is made to determine if the communication was successfully established through the first candidate gateway. If not, the method proceeds to step S510, where a check is performed to determine if there are any candidate gateways left to try. If not, the method ends. If so, the method proceeds to step S512, where the IP address for the next candidate gateway in the obtained routing information is selected. The method then loops back to step S506, and the proxy server 102 sends another communication setup request to the device having the IP address selected in step S512. This process repeats until the communication is established through one of the candidate gateways, at which point the method proceeds to step S514.

In step S514, a CDR unit 106 of the IP telephony system 100 receives information about the communication. The information will include the "route" and the "rank" of the gateway that ultimately established the communication to the second communication device 60. Finally, in step S516, the CDR unit 106 creates and stores a final CDR for the communication. This would occur after the communication has been terminated, and when all available information has been received. The final CDR created in step S516 includes the route and rank information.

Note, each time that an unsuccessful communication setup attempt occurs, the gateway what was incapable of setting up the communication may also report information to the CDR unit 106. The CDR unit 106 may create and store a CDR for each unsuccessful setup attempt. However, the important point is that the CDR which is ultimately established and stored for the successful setup attempt will include the route and rank information.

The monitoring unit 110 can analyze the information contained in the CDRs for purposes of troubleshooting and quality improvement. Some of the analyses can use the route and rank information in various ways to identify potential trouble spots, and to improve the overall functioning of the IP telephony system.

For example, the monitoring unit 110 may review the route and rank information in the CDRs created by the CDR unit 106 on a periodic basis to check on how individual gateways are performing. This is done by checking all CDRs that have a particular route. Specifically, the monitoring unit 110 is looking to determine what ranks are appearing in the CDRs that all have a particular route.

With reference to FIG. 3, the monitoring unit 110 could review all CDRs that have a route of "70381641." This route corresponds to the fourth row of the routing table 300. The monitoring unit 110 determines which ranks appear in the CDRs that have been established for communications that were completed to this route. If the monitoring unit 110 finds that only 10% of all calls to this route include the rank A, that would mean that only 10% of the calls made to that route were completed by the gateway having the IP address appearing in the "A" rank column of the routing table 300. If the monitoring unit 110 also finds that none of the CDRs having route 70381641 have a rank of B, it would mean that the gateway having the IP address in the B rank column of this row of the routing table is not completing any calls. If the monitoring unit 110 finds that 85% of the CDRs with the route 70381641 have the rank C, it would mean that 85% of the calls placed to that route were ultimately completed by the gateway having the IP address in the C rank column of this row of the routing table.

With the information developed as explained above, the monitoring unit 110 may decide to modify this row of the routing table. For example, the monitoring unit 110 may decide to remove the IP address that was previously in the B rank position of the routing table 300, because the gateway with that IP address is not completing any calls. Similarly, the IP address that was ranked C could be moved to the A rank position, because this candidate gateway is successfully completing the majority of all calls placed to this route. The IP address that was previously in the A rank position could be moved to the B rank position. Re-ordering the IP addresses for route 70381641 in this fashion should result in calls to that route being more quickly completed to the dialed telephony devices, because attempts to place calls through poorly performing gateways would not be made in the first place.

Of course, decisions about how to re-order of the IP addresses in a routing table could be far more complex. Typically, the cost of completing the calls through each of the gateways is taken into consideration when determining the ranks of the various IP addresses. In fact, if a first gateway can complete calls to the route for a lower cost than other gateways, the first gateway may be placed in the A rank position, even through it often fails to successfully establish communications to called telephony devices. Thus, the call completion rates through the gateways may only be one of several factors that must be considered when deciding how to rank the gateways.

Figure 6:
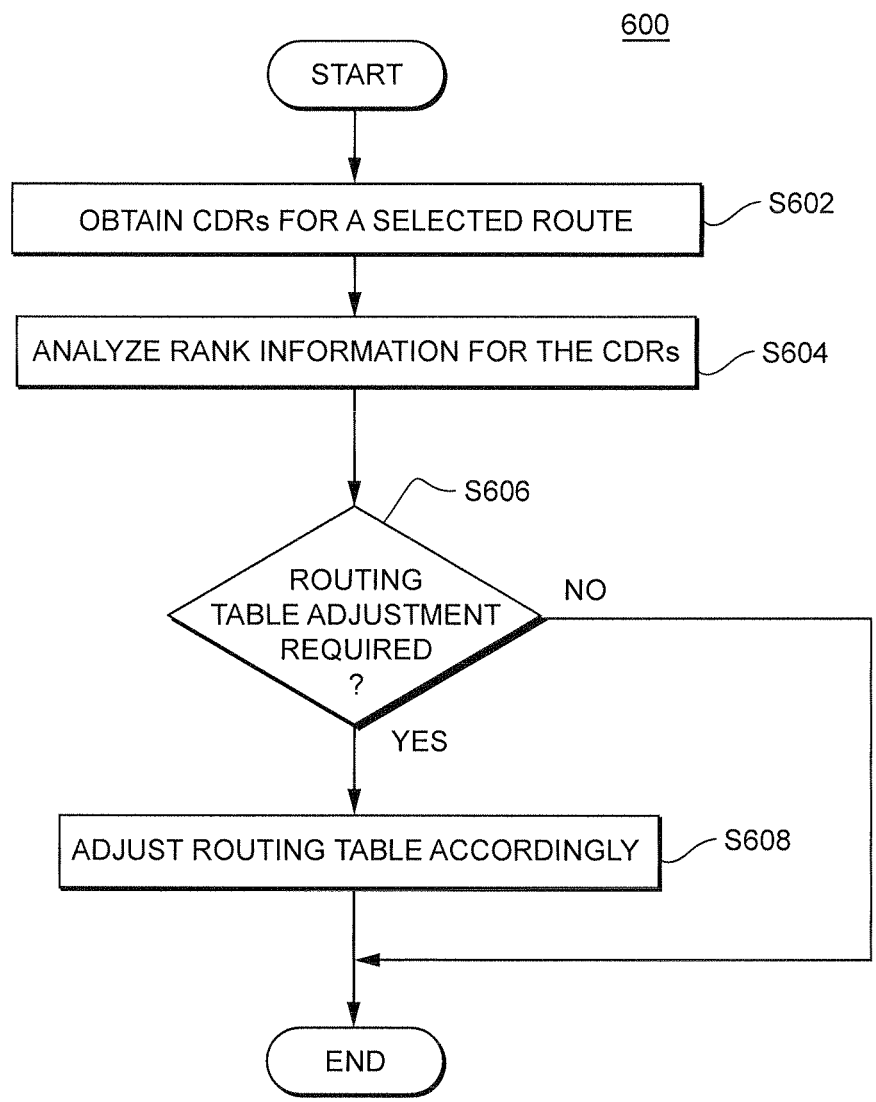
FIG. 6 is a diagram illustrating steps of a method of analyzing and adjusting routing information in a routing table.

FIG. 6 illustrates steps of a method 600 of reviewing CDRs and re-ordering the information in a routing table based on that review. Although not limited to this particular embodiment, the IP telephony system 100 may execute the process shown in FIG. 6.

The method begins and proceeds to step S602 where the monitoring unit 110 of an IP telephony system 100 obtains the CDRs for a particular route. The CDRs that are obtained could be all CDRs for that route for a particular period of time. For example, step S602 could involve obtaining the CDRs for a particular route that have been recorded over the last 24 hours. Step S602 could also involve obtaining the CDRs for a particular route for a shorter or longer period of time.

In step S604 the monitoring unit analyzes the information contained in the obtained CDRs to make certain determinations. The analysis could include determining the number or percentage of communications that are completed through each of the ranked candidate gateways, and then comparing the results to the order in which the candidate gateways are presently ranked, as explained above.

In step S606, the results of the analysis are used to make a determination about whether the routing table should be modified. As explained above, this could include re-ordering the candidate gateways or removing certain candidate gateways. The object of the modification to the routing table could be to improve the speed of connection of calls placed to the particular route. Alternatively, a modification could be made in an attempt to route more calls through a particularly reliable gateway, or one which offers high call quality. The modification may also be intended to reduce costs by routing more calls through a gateway which is inexpensive to use. Other factors may also be considered when determining whether and how to modify a routing table.

If the result of the determination in step S606 indicates that no modification should be made, the method ends. If the determination made in step S606 indicates that a modification to the routing table should be made, the method proceeds to step S608, and the modification to the routing table is performed. The method would then end.

The method illustrated in FIG. 6 is performed to analyze the CDRs for a particular route that were generated over a particular period of time. The method would be performed again to analyze the CDRs that were generated for a different route over another particular period of time.

Also, the method illustrated in FIG. 6 might be performed multiple times for the same route, and during each performance, the CDRs for that route that were recorded over a different period of time would be analyzed. For example, the method could be performed a first time for CDRs generated over the last 24 hours, and a second time for CDRs generated over the last week. The relative results of the analysis performed during for the different periods of time are then taken into account in determining whether and how to modify the routing table.

For example, the analysis of the CDRs for a particular route may indicate that one candidate gateway performs well Monday through Friday, but performs poorly on Saturday and Sunday. With this knowledge, the routing table may be adjusted to give the IP address of that gateway a relatively high rank on Monday through Friday, but a relatively low rank on Saturday and Sunday. Thus, the ranking of IP addresses for a particular route may change based on the day of the week. The ranks of the IP addresses for a particular route may also change based on the time of day, or based on other time varying factors.

As explained above, information that is reported to the CDR unit 106 is used by the CDR unit 106 to create a final CDR for each communication. As also explained above, the route and rank information is reported to the CDR unit 106 by at least one of the devices involved in setting up and carrying a communication.

Figure 7:
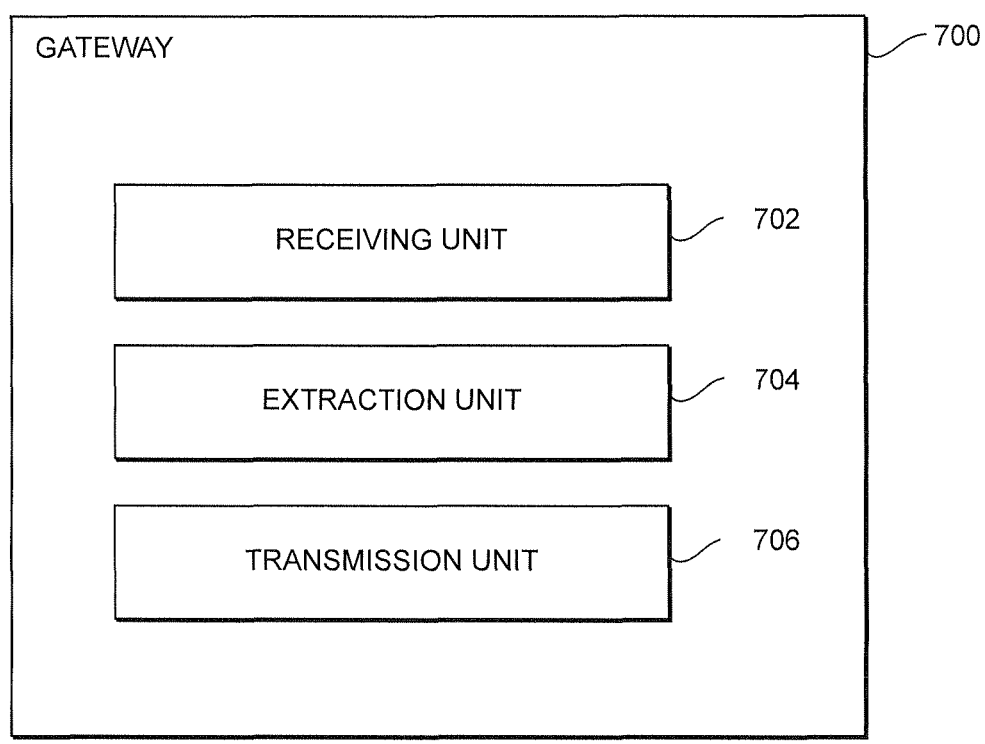
FIG. 7 is a diagram illustrating elements of a candidate gateway that could be involved in setting up a communication to a destination telephony device.

FIG. 7 illustrates elements of a gateway 700 which could be used to help setup a communication to a destination telephony device. FIG. 7 illustrates steps of a method 800 that would be performed by the gateway 700 to report the route and rank information to the CDR unit 106 of an IP telephony system 100.

As illustrated in FIG. 7, the gateway 700 includes a receiving unit 702 that would receive a call setup request from a proxy server. An extraction unit 704 of the gateway 700 would extract route and rank information from the call setup request. A transmission unit 706 would send the extracted route and rank information to a CDR unit of an IP telephony system along with the other information that is normally reported to the IP telephony system.

Figure 8:
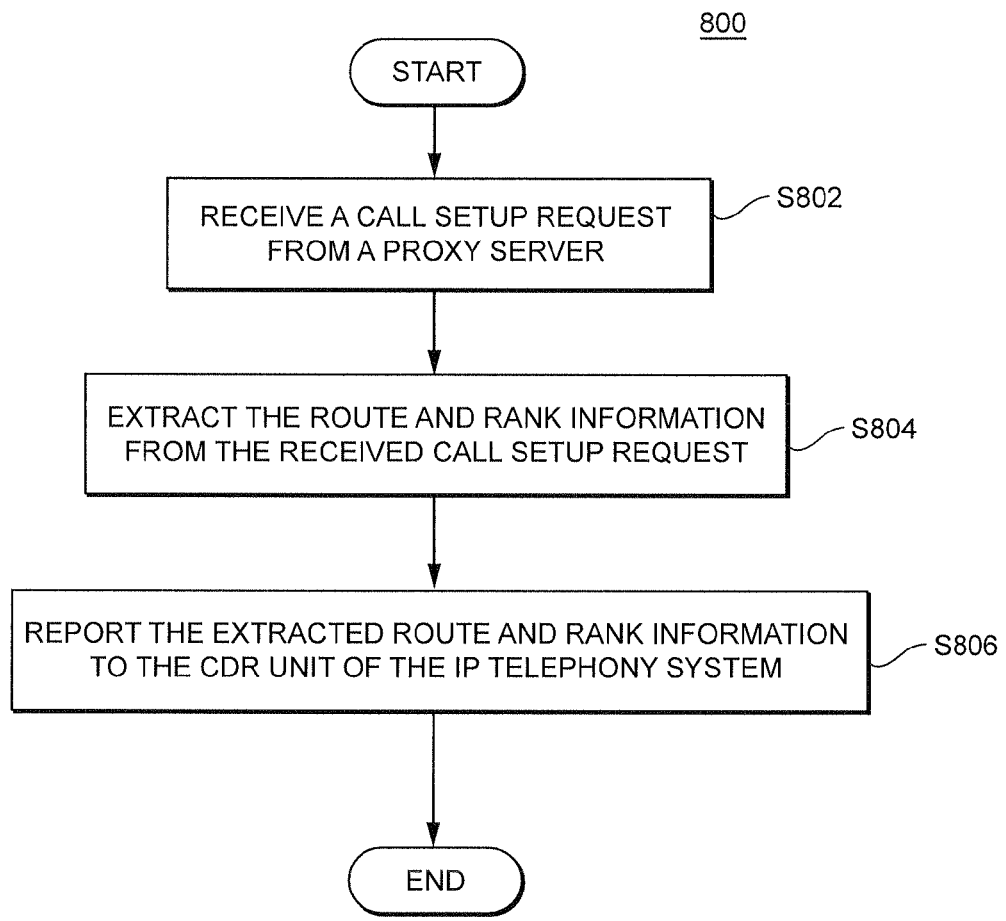
FIG. 8 is a diagram illustrating steps of a method performed by a destination gateway to forward routing information to a CDR unit of an IP telephony system.

The method illustrated in FIG. 8 begins and proceeds to step S802 where a receiving unit 702 of the candidate gateway 700 receives a call setup request from a proxy server 102 that is attempting to setup a call to a destination telephony device 60. As explained above, the route and rank information is encoded in the setup signaling received from the proxy server 102.

In step S804, the extraction unit 704 of the candidate gateway 700 extracts the route and rank information from the setup signaling. Then, in step S806 a transmission unit 706 of the candidate gateway 700 sends the extracted route and rank information to the CDR unit 106 of an IP telephony system 100. The route and rank information may only be sent to the CDR unit 106 if the candidate gateway is successful in establishing the requested communication to the destination telephony device 60.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method implemented using an IP telephony system having at least one processor and for analyzing information contained in call detail records (CDRs), comprising:
    obtaining information from CDRs for communications that have been sent to a particular route;
    analyzing, via the at least one processor, route and rank information obtained from the CDRs, wherein the rank information is indicative of a prioritization order of candidate gateways that appear in a routing table; and
    determining whether to modify a routing table based on a result of analyzing the obtained route and rank information.

2. The method of claim 1, wherein the determining step further comprises determining how to modify the routing table based on the result of the analyzing step.

3. The method of claim 1, further comprising modifying the routing table based on the result of the analyzing step.

4. The method of claim 3, wherein the modifying step comprises modifying a prioritization order of IP addresses of candidate gateways appearing in the routing table.

5. The method of claim 3, wherein the modifying step comprises removing at least one IP address of a candidate gateway from the routing table.

6. The method of claim 1, wherein the obtaining step comprises obtaining information from CDRs for communications sent to the particular route over a predetermined period of time.

7. The method of claim 1, wherein the particular route is a pattern of digits of a telephone number.

8. The method of claim 1, wherein the rank information is indicative of a prioritization order of an IP address of a candidate gateway that appears in the routing table.

9. A system for analyzing information contained in call detail records (CDRs) of an IP telephony system, comprising:
    means for obtaining information from CDRs for communications that have been sent to a particular route;
    means for analyzing route and rank information obtained from the CDRs, wherein the rank information is indicative of a prioritization order of candidate gateways that appear in a routing table; and
    means for determining whether to modify a routing table based on the analysis of the obtained route and rank information by the analyzing means.

10. A system for analyzing information contained in call detail records (CDRs) of an IP telephony system, comprising:
    a monitoring unit comprising at least one computer processor that obtains information from CDRs for communications that have been sent to a particular route, that analyses route and rank information obtained from the CDRs, wherein the rank information is indicative of a prioritization order of candidate gateways that appear in a routing table, and that determines whether to modify a routing table based on a result of the analysis of the obtained route and rank information in the CDRs.

11. The system of claim 10, wherein the monitoring unit also determines how to modify the routing table based on the analysis of the route and rank information in the CDRs.

12. The system of claim 10, wherein the monitoring unit causes the routing table to be modified based on the result of the analysis of the route and rank information in the CDRs.

13. The system of claim 12, wherein the monitoring unit causes a prioritization order of IP addresses of candidate gateways appearing in the routing table to be modified.

14. The system of claim 12, wherein the monitoring unit causes at least one IP address of a candidate gateway to be removed from the routing table.

15. The system of claim 10, wherein the monitoring unit obtains information from CDRs for communications sent to the particular route over a predetermined period of time.

16. The system of claim 10, wherein the particular route is a pattern of digits of a telephone number.

17. The system of claim 10, wherein the rank information is indicative of a prioritization order of an IP address of a candidate gateway that appears in the routing table.

* * * * *